Figure 1:
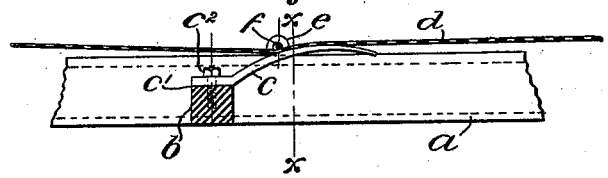

(No Model.)

P. D. HARTON.
CAKE MACHINE.

No. 524,022.  Patented Aug. 7, 1894.

WITNESSES:
Thomas M. Smith.
Richard E. Maxwell.

INVENTOR
Pembroke D. Harton.
BY
J. Walter Douglass.
ATTORNEY.

UNITED STATES PATENT OFFICE.

PEMBROKE D. HARTON, OF PHILADELPHIA, PENNSYLVANIA, ASSIGNOR TO J. HENRY MITCHELL, OF SAME PLACE.

CAKE-MACHINE.

SPECIFICATION forming part of Letters Patent No. 524,022, dated August 7, 1894.

Application filed May 31, 1893. Serial No. 476,036. (No model.)

*To all whom it may concern:*

Be it known that I, PEMBROKE D. HARTON, a citizen of the United States, residing at the city of Philadelphia, in the county of Philadelphia and State of Pennsylvania, have invented certain new and useful Improvements in Cake-Machines, of which the following is a specification.

My invention has relation in general to cake machines; and more particularly in that connection to appliances or devices for automatically stripping or releasing dough or analogous substances or materials deposited on and adhering in a greater or less degree to an endless traveling carrier apron or conveyer of such a machine.

The principal objects of my invention are, first, to provide a cake or similar machine with a simple, inexpensive and effective appliance for automatically stripping or releasing dough in the form of cakes or analogous substances or materials deposited on and adhering to the endless carrier apron or conveyer thereof, in order to permit of the ready removal of the same in a perfect condition for baking or other purposes; second, to provide a cake-machine with a laterally adjustable stripping or releasing device; and third, to provide a cake machine with a spring controlled carrier apron or conveyer and an adjustable material stripping or releasing device engaging the surface of the carrier apron or conveyer in such manner as that by the movement of the carrier apron or conveyer the deposited and adhering material thereof by contacting with the device is stripped or released therefrom.

My invention consists of a cake machine provided with a supporting bed, a carrier and a stripping device adapted to contact with the carrier.

My invention further consists of a cake machine provided with a convex supporting bed, an endless conveyer and a stripping device located above the conveyer and conforming thereto and to the supporting bed.

My invention further consists of a cake machine provided with a carrier apron or conveyer adapted for the reception of material such as dough or analogous material in the form of cakes and having devices for maintaining the same under spring tension and an adjustable material stripping or releasing device located in proximity to one surface of the carrier apron or conveyer.

My invention further consists of a cake-machine provided with a carrier apron or conveyer adapted for the reception of dough or analogous material in the form of drop-cakes or the like and having a series of leaf or other springs bearing against one surface thereof and a stripping or releasing device contacting with the other surface of the carrier apron or conveyer; and my invention further consists of the improvements in cake-machines hereinafter described and claimed.

The nature and general features of my invention will be more fully understood from the following description taken in connection with the accompanying drawings forming part hereof; and in which—

Figure 2:
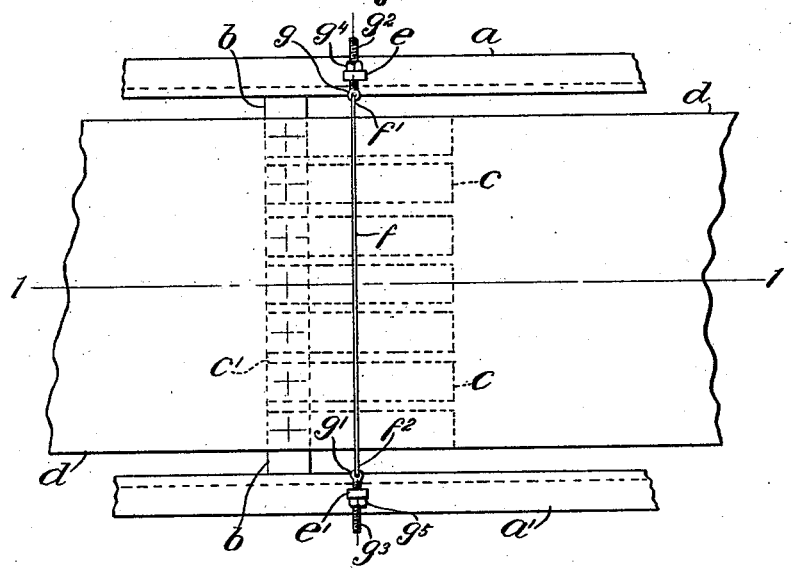
Figure 3:
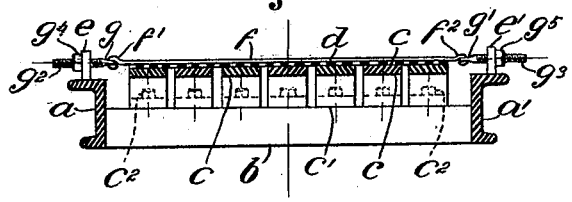

Figure 1, is a vertical longitudinal sectional view on the line 1—1, of Fig. 2, showing a portion of an endless carrier apron or conveyer with one of a series of spring devices in contact with the under surface thereof and with an automatic stripping and releasing device in contact with the upper surface of the apron or conveyer. Fig. 2, is a top or plan view of my invention; and Fig. 3, is a transverse section on the line $x$—$x$, of Fig. 1.

Referring to the drawings $a$ and $a'$, are the longitudinal strips or frames of the standards of the machine, not shown.

$b$, is a cross-rod or bar suitably connected with the strips or frames.

$c$, is a series of convexly curved leaf or other spring devices provided with seats $c'$, adapted to engage the cross-rod or bar $b$, by means of bolts $c^2$. These devices $c$, normally engage and form a supporting bed for an endless longitudinal carrier apron or conveyer $d$, with a spring pressure in substantially the manner illustrated in Fig. 1.

$e$ and $e'$, are bearing posts or supports suitably connected with the longitudinal strips or frames $a$ and $a'$.

$f$, is a wire cutter-bar or wire-rod having end catches $f'$ and $f^2$, engaging complemental loops or eyes $g$ and $g'$, of swivel-bolts $g^2$ and $g^3$, which are held in the bearing posts $e$ and $e'$, by means of nuts $g^4$ and $g^5$, and for adjustably securing the cutter-bar or wire-rod $f$, constituting the stripping or releasing device of the machine, to position, in order to permit in the travel of the carrier apron or conveyer containing the deposits of dough or analogous material, the same to be released by its contact with the edge or side of the blade or wire of the device.

It may be here remarked that the material usually deposited in cake machines to which my invention is especially applicable, is of a sticky nature, so that there is a constant tendency of the same to adhere to the carrier conveyer or apron thereof.

It has hitherto been customary to dust flour or similar material onto the carrier apron or conveyer before permitting of the deposits of the dough or similar materials in the form, for example, of drop cakes or the like, and after passing along the same for some distance to then remove the deposited material in different forms by means of knives by the aid of the attendant-in-charge of the machine, but this mode of removing the material from the carrier apron or conveyer is not only slow and unsatisfactory, but the deposits are disturbed and come from the machine usually in an imperfect condition.

By the employment of the hereinbefore described stripping or releasing device with the complemental spring appliances contacting with the carrier apron or conveyer the material in different or similar forms is automatically released or stripped from the carrier apron or conveyer and in a perfect condition for delivery for further treatment, such as baking or the like.

In the operation of the machine, the traveling carrier apron or conveyer thereof, with the deposited material in different or like forms thereon, is maintained under spring tension in contact with the stripping device, which completely releases the deposited cakes or the like in their passage and they are delivered in perfect condition from the machine for further treatment, in order to adapt the same for use.

It will be obvious that modifications may be made in the form of the stripping device and also that the carrier apron or conveyer may be maintained under the required pressure for effective action of the stripping or releasing device, without the employment of the series of springs arranged in the precise manner shown and described and without departing from the spirit and scope of my invention.

Having thus described the nature and objects of my invention, what I claim as new, and desire to secure by Letters Patent, is—

1. A cake machine provided with a supporting bed, a carrier and a stripping device adapted to contact with said carrier, substantially as and for the purposes set forth.

2. In a cake machine, the combination with a supporting bed, of an endless carrier, and a stripping device located above said carrier and conforming thereto and to the supporting bed, substantially as and for the purposes described.

3. In a cake machine, the combination with a convex supporting bed, of an endless apron or conveyer, and an adjustable stripping device located above and conforming to said apron or conveyer and to said supporting bed, substantially as and for the purposes described.

4. In a cake machine, the combination with a spring supporting bed, of an apron or conveyer adapted for the reception of dough or analogous substance, and a stripping or releasing device located above said apron or conveyer and conforming thereto and to the supporting bed, the construction being such as to automatically release the material in its passage along said apron or conveyer preparatory to delivery of the same therefrom, substantially as described.

5. In a cake machine, the combination with a supporting bed, of an endless apron or conveyer and a swivel controlled stripping device conforming to said apron or conveyer and to said bed, substantially as and for the purposes described.

In testimony whereof I have hereunto set my signature in the presence of two subscribing witnesses.

PEMBROKE D. HARTON.

Witnesses:
 THOMAS M. SMITH,
 RICHARD C. MAXWELL.